Sept. 7, 1926.  
A. A. TURNAGE  
PNEUMATIC SHOCK ABSORBER  
Filed Dec. 31, 1924
1,598,898
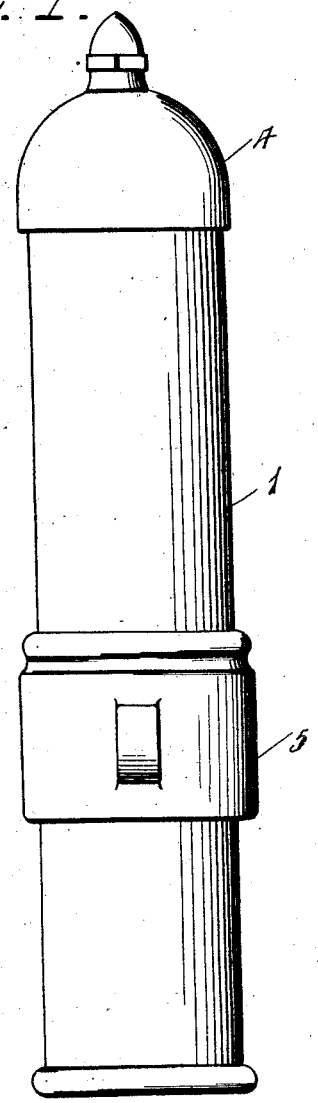
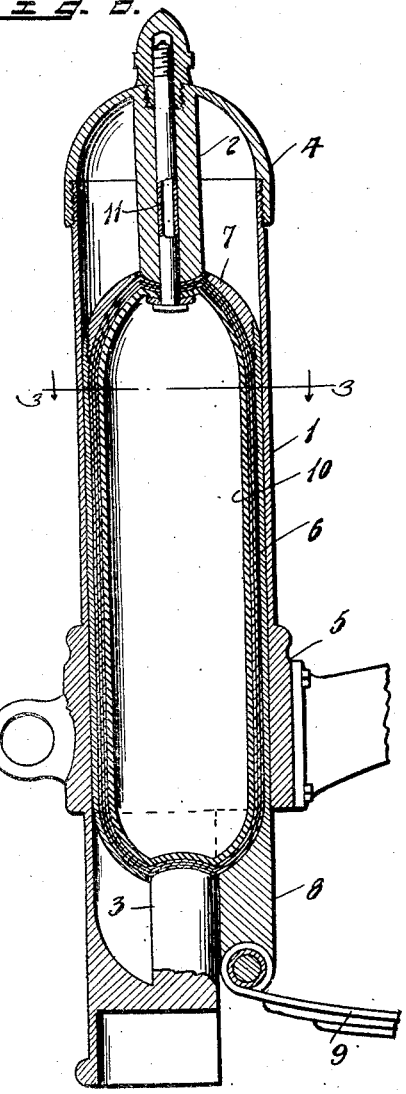
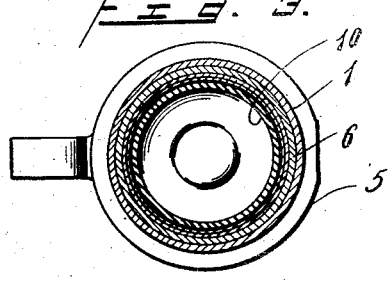
Inventor  
A. A. Turnage,  
By (signature)  
Attorney Patented Sept. 7, 1926.

1,598,898

UNITED STATES PATENT OFFICE.

ALFRED A. TURNAGE, OF SAN FRANCISCO, CALIFORNIA.

PNEUMATIC SHOCK ABSORBER.

Application filed December 31, 1924. Serial No. 759,063.

The present invention has for its object to neutralize shock and vibration of a vehicle when traveling over a rough surface or passing over an obstruction or dropping into a rut or depression in the surface of a road, the same being accomplished by the provision of a shock absorber which also operates as a snubber to control the rebound incident to traffic, thereby preventing injury to springs and discomfort to the occupants of the vehicle.

Other objects and advantages will be apparent and suggest themselves as the nature of the invention is understood.

While the drawings illustrate an embodiment of the invention it is to be understood that in adapting the same to meet different conditions and requirements, various changes in the form, proportion, and minor details of construction may be resorted to without departing from the nature of the invention.

Referring to the accompanying drawings forming a part of the specification,

Figure 1 is a front view of a combined shock absorber and snubber embodying the invention, Figure 2 is a vertical central sectional view of the device, and Figure 3 a transverse sectional view on a plane indicated by the line 3—3 of Figure 2.

Corresponding and like parts are referred to in the following description and designated in the several views of the drawings by like reference characters.

The numeral 1 designates an outer cylinder which is provided at opposite ends with plungers 2 and 3, the plunger 2 forming part of a cap 4 which is threaded or otherwise attached to the upper end of the cylinder 1. A bracket 5 provides means for attaching the cylinder to the body of the vehicle. The numeral 6 denotes an inner cylinder, the ends of which are formed with centrally disposed openings to receive the respective plungers 2 and 3. A cap 7 fitted to the upper end of the inner cylinder 6 is formed with an opening to receive the plunger 2. The lower end of the inner cylinder 6 has an extension 8 adapted to be attached to a spring 9 of the vehicle. A bag 10 preferably of rubber is located within the inner cylinder 6 and its ends sustain the thrust of the plungers 2 and 3, the bag 10 being supplied with air under pressure. An air valve 11 is connected to the upper end of the bag 10 and passes through slidably engaging the plunger 2 and provides for supplying air to the bag as occasion may require. The threads on the valve stem 11 are designed for connection of an air pump nozzle thereto and do not engage the cap nut on the upper end of the cap 4.

The invention contemplates a set of four of the devices to each vehicle, one being located adjacent each corner of the chassis, the weight normally being supported upon the upper ends of the air bag 10 and when the body moves downwardly the air in the bag is compressed and upon the rebound the lower plungers 3 move upwardly thereby compressing the air in the bag from below, it being understood that the plungers being connected move simultaneously in the same direction, that is both move either up or down.

What is claimed is:—

1. A pneumatic shock absorber comprising inner and outer cylinders, a pneumatic bag within the inner cylinder, and plungers secured to the ends of the outer cylinder and adapted to operate through openings formed in the ends of the inner cylinder.

2. A pneumatic shock absorber comprising inner and outer cylinders, a pneumatic bag within the inner cylinder, and plungers connected to the ends of the outer cylinder and adapted to operate through openings formed in the ends of the inner cylinder, the upper plunger having an opening therethrough to receive the valve stem of the air bag.

In testimony whereof I affix my signature.

ALFRED A. TURNAGE.